US011287313B2

(12) United States Patent
Akai et al.

(10) Patent No.: US 11,287,313 B2
(45) Date of Patent: Mar. 29, 2022

(54) DETECTING COMPOSITIONS AND METHOD OF USING SAME

(71) Applicants:Showa Denko Materials Co., Ltd., Tokyo (JP); Showa Denko Materials (America), Inc., San Jose, CA (US)

(72) Inventors: Kunihiko Akai, Irvine, CA (US); Shingo Kobayashi, Cupertino, CA (US); Nobuyuki Ogawa, Irvine, CA (US)

(73) Assignees: Showa Denko Materials Co., Ltd., Tokyo (JP); Showa Denko Materials (America), Inc., San Jose, CA (US)

( * ) Notice: Subject to any disclaimer, the term of this patent is extended or adjusted under 35 U.S.C. 154(b) by 0 days.

(21) Appl. No.: 16/204,432

(22) Filed: Nov. 29, 2018

(65) Prior Publication Data

US 2019/0195686 A1   Jun. 27, 2019

Related U.S. Application Data

(60) Provisional application No. 62/593,542, filed on Dec. 1, 2017.

(51) Int. Cl.
| | | |
|---|---|---|
| *G01J 1/04* | (2006.01) | |
| *G02B 5/136* | (2006.01) | |
| *G02B 5/20* | (2006.01) | |
| *G01J 1/58* | (2006.01) | |

(52) U.S. Cl.
CPC ............ *G01J 1/0407* (2013.01); *G01J 1/0488* (2013.01); *G01J 1/58* (2013.01); *G02B 5/136* (2013.01); *G02B 5/208* (2013.01)

(58) Field of Classification Search
CPC .......... G01J 1/0407; G01J 1/0488; G01J 1/58; G02B 5/136; G02B 5/208
See application file for complete search history.

(56) References Cited

U.S. PATENT DOCUMENTS

| | | | | |
|---|---|---|---|---|
| 4,142,196 A | * | 2/1979 | Diguet | ................ H01L 33/0025 257/90 |
| 2009/0174929 A1 | * | 7/2009 | Egawa | ...................... G02F 1/37 359/328 |
| 2014/0137941 A1 | * | 5/2014 | Orsley | ................... C12M 31/04 136/259 |
| 2015/0096615 A1 | * | 4/2015 | Lee | ................... H01L 31/02168 136/257 |
| 2016/0233365 A1 | * | 8/2016 | Van Der Kolk | ...... H01L 31/055 |

FOREIGN PATENT DOCUMENTS

KR          101632834 B1  *  6/2016

\* cited by examiner

*Primary Examiner* — Marcus H Taningco
(74) *Attorney, Agent, or Firm* — Morgan, Lewis & Bockius LLP

(57) ABSTRACT

The disclosure provides a detecting composition or layer; a film, a device, a tape and a detecting system having the detecting layer; and methods of use thereof.

16 Claims, 2 Drawing Sheets

DETECTING COMPOSITIONS AND METHOD OF USING SAME

BACKGROUND

In 2016, motor vehicle-related crashes on U.S. highways claimed 37,461 lives. Our research tells us that 94 percent of serious crashes are due to dangerous choices or errors people make behind the wheel. Today's new vehicles already include proven automated safety features that help drivers avoid crashes by warning them of crash risk and, in some cases, helping drivers brake or steer when they don't react quickly enough. As driver assistance technologies improve, they may eventually result in vehicles that can control all aspects of the driving task: truly "self-driving" vehicles.

The self-driving vehicles, however, face a challenge in recognizing and identifying their environment on their own, and various sensors have been developed to enhance the recognition ability of the self-driving vehicles without much success.

SUMMARY OF THE DISCLOSURE

In one aspect, the inventors found that some of the effective sensors for the self-driving vehicles are near-infrared ray or radiation sensors. The near-infrared ray or radiation is longer than a visible light region and cannot be recognized by the naked eye. Further, a near-infrared light scattering is not easy to occur because the near-infrared light has a longer wavelength than the visible light. Therefore, images based on the near-infrared reflected light are stable without depending on the sunlight or weather. By applying the near-infrared sensor to a vehicle, information reflecting the visible light and information reflecting only the near-infrared light may be overlapped on the same display, such as a road sign, and the image processing speed in the near-infrared sensor may be improved. Moreover, if a vehicle has LED lamps, which does not shine any near-infrared ray or radiation, the information reflecting only the near-infrared light would not be detected without shining a separate source of near-infrared ray or radiation, such a sunlight.

In one aspect, the present disclosure relates to compositions of matter useful, for example, for marking, detection and/or identification purposes comprising an infrared absorbing material and a wavelength converting material.

The present disclosure may be useful for a navigation system to operate an autonomous vehicle that has a self-drive system while monitoring the driving situation thereof. In particular, it may be useful for applying to a navigation system to operate an autonomous vehicle relating to destinations, driving positions, driving status or recognition of road signs. This system may capture an image of a road sign, barricade, license plate, road surface marking, marking tape or clothing including a material of the present invention with an infrared camera and control the autonomous vehicle on the basis of the detected information.

In another aspect, the present disclosure relates to a detecting layer described in sections [1]-[30] below.

[1] A detecting layer comprising (i) a first layer comprising an infrared absorbing material; and (ii) a second layer comprising a wavelength converting material.

[2] The detecting layer according to section [1], wherein the infrared absorbing material is selected from the group consisting of cyanine compounds, phthalocyanine compounds, dithiol metal complexes, naphthoquinone compounds, diimonium compounds, azole compounds, cesium tungstenate compounds (CWO), antimony doped tin oxides (ATO), tin doped indium oxide (ITO), titanium oxide, zirconium oxide, tantalum oxide, niobium oxide, zinc oxide, indium oxide, tin oxide, cesium oxide, and zinc sulfate.

[3] The detecting layer according to section [1] or [2], wherein the wavelength converting material comprises a quantum dot compound.

[4] The detecting layer according to any one of sections [1]-[3], wherein the first layer and/or the infrared absorbing material of the first layer absorbs ray or radiation in the emission wavelength region of the wavelength converting material of the second layer.

[5] The detecting layer according to any one of sections [1]-[4], wherein the infrared absorbing material absorbs ray or radiation from about 700 nm to about 2000 nm.

[6] The detecting layer according to any one of sections [1]-[5], wherein an emission wavelength of the wavelength conversion material is within infrared region.

[7] The detecting layer according to any one of sections [1]-[6], wherein an emission wavelength of the wavelength conversion material is from about 700 nm to about 2000 nm.

[8] The detecting layer according to any one of sections [1]-[7], further comprising a binding layer comprising an adhesive between the first and second layers.

[9] The detecting layer according to any one of sections [1]-[8], wherein the first layer is disposed on at least a part of a surface of the second layer.

[10] The detecting layer according to section [9], wherein the first layer includes machine-readable information.

[11] The detecting layer according to any one of sections [1]-[8], wherein the second layer is disposed on at least a part of a surface of the first layer.

[12] The detecting layer according to section [11], wherein the second layer includes machine-readable information.

[13] The detecting layer according to section [11] or [12], wherein the second layer transmits visible light.

[14] The detecting layer according to section [11] or [12], wherein the second layer is transparent.

[15] A detecting layer comprising (i) a first layer comprising a retroreflective layer; and (ii) a second layer comprising a wavelength converting material.

[16] A detecting layer comprising a retroreflective material and a wavelength converting material.

[17] A film comprising the detecting layer of any one of sections [1]-[16], further comprising a substrate. In some embodiments, the substrate is on a surface of the second layer that is different from the surface on which the first layer or the first layer is disposed.

[18] A device comprising the detecting layer of any one of sections [1]-[16] or the film of section [17], wherein the first or second layer is on a visible layer of the device. In some embodiments, the device is other than a solar panel.

[19] A kit to prepare the detecting layer of any one of sections [1]-[16] or the film of section [17], the kit comprising a first solution comprising the infrared absorbing material, and a second solution comprising the wavelength converting material.

[20] A tape comprising the detecting layer of any one of sections [1]-[16] or the film of section [17].

[21] A tape comprising a substrate and a layer comprising a wavelength converting material on at least a part of a surface of the substrate.

[22] The tape according to section [21], wherein the wavelength converting comprising a quantum dot compound.

[23] The tape according to section [21] or [22], wherein an emission wavelength of the wavelength conversion material is within infrared region.

[24] The tape according to any one of sections [21]-[23], wherein an emission wavelength of the wavelength conversion material is from about 700 nm to about 2000 nm.
[25] The tape according to any one of sections [21]-[24], wherein the second layer transmits visible light.
[26] The tape according to any one of sections [21]-[25], wherein the second layer is transparent.
[27] The tape according to any one of sections [21]-[26], wherein the substrate reflects light of at least 700 nm.
[28] A detecting system comprising (i) the detecting layer of any one of sections [1]-[16], the film of section [17], the device of section [18], the kit of section [19] or the tape of any one of sections [20]-[27], and (ii) a detector to detect infrared emission.
[29] A method of detecting machine-readable information, the method comprising: (i) applying near-infrared light to an applied surface of the detecting layer of any one of sections [1]-[16], the film of section [17], the device of section [18] or the tape of any one of sections [20]-[27]; and (ii) detecting infrared emission from the applied surface.
[30] A method of preparing the detecting layer of any one of sections [1]-[16] or the film of section [17], the method comprising: disposing a first solution comprising the infrared absorbing material, and disposing a second solution comprising the wavelength converting material. In some embodiments, the first and second solutions are disposed on a substrate or a mold.

DETAILED DESCRIPTION

Figure 1:
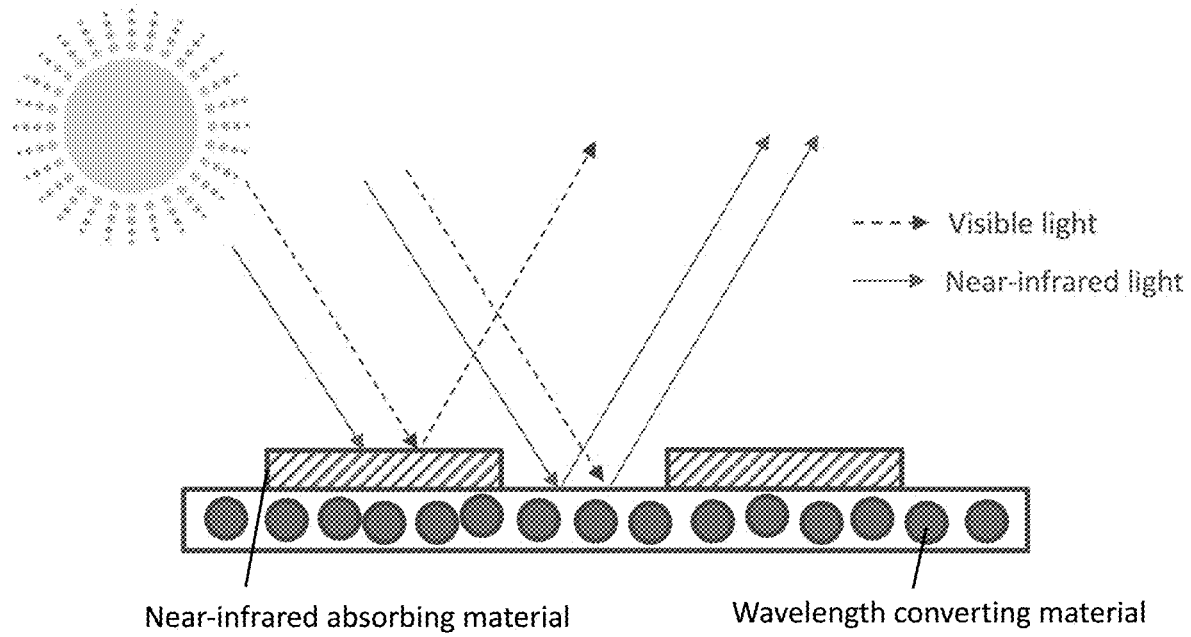
FIG. 1 depicts one exemplary embodiment of a detecting layer.
Figure 2:
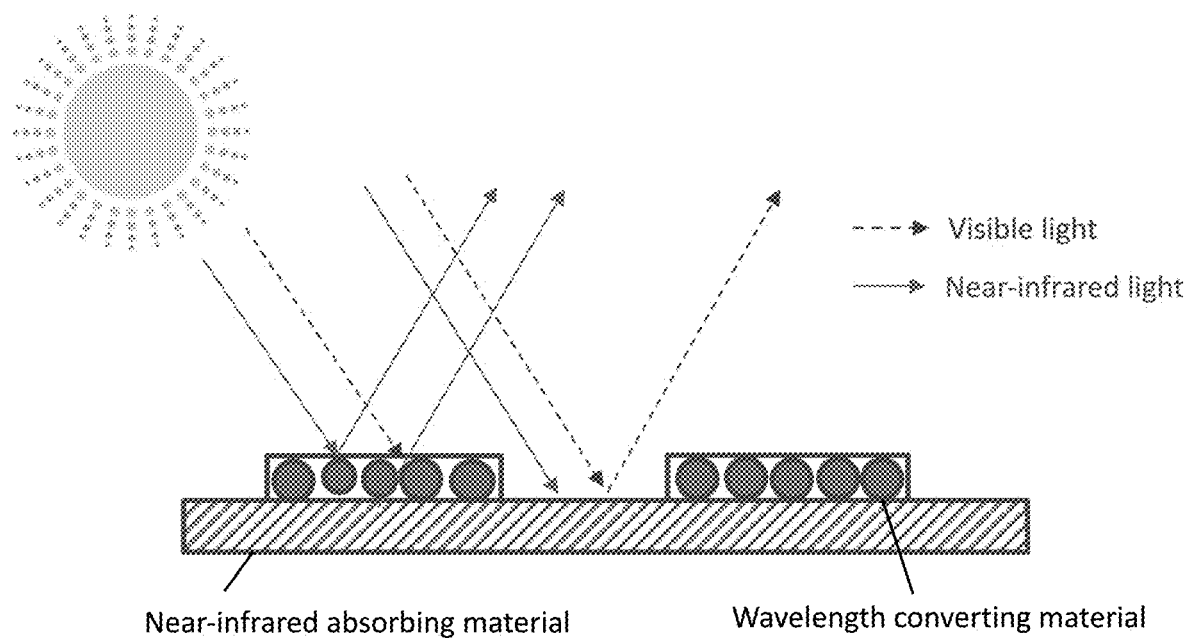
FIG. 2 depicts another exemplary embodiment of a detecting layer.
Figure 3:
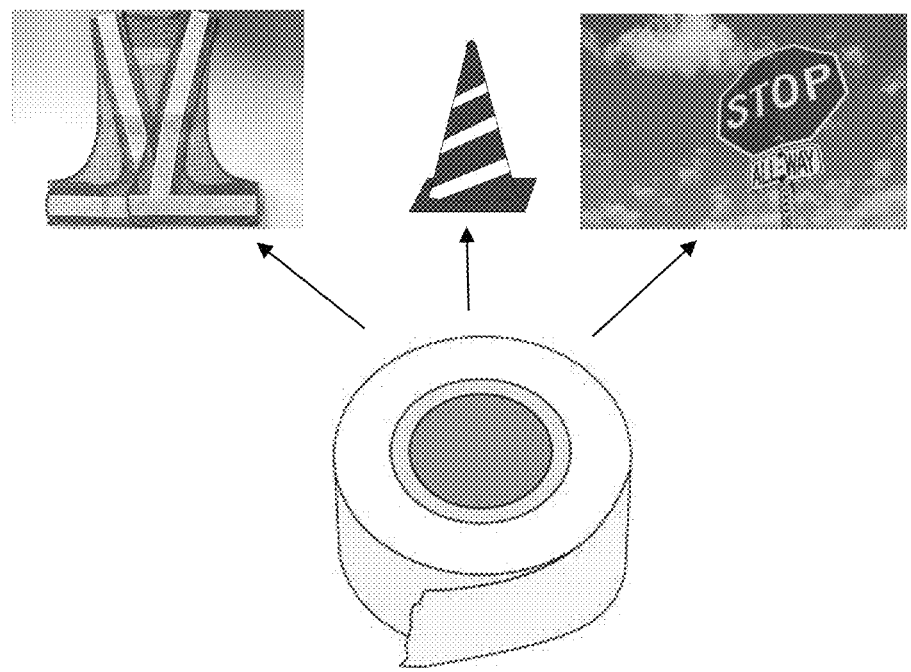
FIG. 3 depicts another exemplary embodiment of a film and a tape.

In one aspect, the present disclosure relates to an energy conversion layer or a film that blocks an incident light of a specific wavelength band, such as solar light, LED, by absorbing the light and emitting the energy therefrom as light having a lower energy wavelength than the absorbed light. In this disclosure, this process is referred to as "converting" the absorbed light into the emitted light, or as emitting the absorbed light as lower energy light. For example, the layer or film comprising wavelength converting materials may absorb visible light and convert them into near-infrared light or the like. For example, visible light has a wavelength of about 380 nm to about 780 nm, near-infrared light has a wavelength exceeding about 780 nm and less than about 2100 nm.

In one aspect, the present disclosure relates to a composition of matter or a detecting layer or film comprising (i) a first layer comprising an infrared absorbing material; and (ii) a second layer comprising a wavelength converting material. As used herein, a "detecting layer" refers to a layer that is to be detected. The layer may have a thickness from about 10, 20, 30, 40, 50, 60, 70, 80, 90, 100, 110, 120, 130, 140, 150, 200, 300, 400, 500, 600, 700 or 800 micrometer to about 10000, 5000, 4000, 3000, 2000, 1000, 900, 800, 700, 600, 500, 400, 300, 200, 100 or 50 micrometer. The layer may have a thickness from about 10 to about 10000 micrometer, from about 1400 to about 4000 micrometer, from about 2000 to about 3000 micrometer, from about 1000 to about 2000 micrometer, or from about 1000 to about 5000 micrometer. In some embodiments, the detecting layer disclosed herein may transmit visible light and/or be transparent. In additional embodiments, the light transmittance of the detecting layer is at least about 60, 65, 70, 75, 80, 85, or 90% with respect to light rays in the visible light range (wavelength: about 380-780 nm). The light transmittance may be measured using a spectrophotometer. As an example, the spectrophotometer may be a Hitachi Model U-3310 spectrophotometer (e.g., with integrating sphere).

In some embodiments, the composition of matter or a detecting layer or film disclosed herein may comprise an infrared absorbing material. The infrared light absorbing material may be a material or compound that absorbs near infrared light radiation (for example, wavelength of about 780 nm to about 2100 nm). "Infrared light absorbing material" refers to a substance or a material that contains the substance where the average transmissivity of light with a wavelength from about 780 to about 2100 nm is lower than the average transmissivity of light with a wavelength from 380 to 780 nm.

Examples of the infrared absorbing material include infrared light absorbing colorants, such as cyanine compounds, phthalocyanine compounds, dithiol metal complexes, naphthoquinone compounds, diimonium compounds, azole compounds, and the like, and infrared light absorbing pigments, such as cesium tungstenate compounds (CWO), antimony doped tin oxides (ATO), tin doped indium oxide (ITO), titanium oxide, zirconium oxide, tantalum oxide, niobium oxide, zinc oxide, indium oxide, tin oxide, cesium oxide, zinc sulfate, and the like. The infrared light absorbing material may comprise a cesium tungstenate compound for improved weather resistance. Cesium tungstenate compounds have a deep blue color but are advantageous from the perspective that the required infrared light absorption may be maintained without affecting the background color (base color) by appropriately adjusting the concentration. In additional embodiments, the composition of matter or a detecting layer or film disclosed herein may comprise at least one, two, three, four, five or six infrared absorbing materials selected from the group consisting of cyanine compounds, phthalocyanine compounds, dithiol metal complexes, naphthoquinone compounds, diimonium compounds, azole compounds, cesium tungstenate compounds (CWO), antimony doped tin oxides (ATO), tin doped indium oxide (ITO), titanium oxide, zirconium oxide, tantalum oxide, niobium oxide, zinc oxide, indium oxide, tin oxide, cesium oxide, and zinc sulfate. In some embodiments, the infrared light absorbing material may be cesium tungstenate. In additional embodiments, the cesium tungstenate compound has a general formula of $Cs_xW_yO_z$, in which $0.001<x/y<1$, and $2.2<z/y<3.0$. In further embodiments, the cesium tungstenate compound has a general formula of $Cs_xW_yO_z$, in which $0.1<x/y<1$, and $2.45<z/y<3$.

In additional embodiments, the average particle diameter of the infrared light absorbing material may be from about 10, 20, 30, 40, 50, 60, 70, 80, 90 or 100 nm to about 1000, 500, 400, 300, 200, 100, 90, 80, 70, 60, 50, 40 or 30 nm. In additional embodiments, the average particle diameter of the infrared light absorbing material may be from about 10 nm to about 500 nm, from about 20 nm to about 100 nm, from about 50 nm to about 200 nm, or from about 10 nm to about 200 nm. In some embodiments, the visibility of the background color (e.g., base color) of the infrared light absorbing material may be in the visible light region.

In further embodiments, the layer comprising the infrared light absorbing material may have a thickness from about 10, 20, 30, 40, 50, 60, 70, 80, 90 or 100 micrometer to about 100, 200, 300, 400, 500, 600 or 700 micrometer. In additional embodiments, the thickness of the layer comprising the infrared absorbing material may be from about 10 micrometer to about 1000 micrometer, from about 10 micrometer to about 500 micrometer, from about 100 micrometer to about 800 micrometer, or from about 300 micrometer to about 900 micrometer.

In some embodiments, the composition of matter or a detecting layer or film disclosed herein may comprise a wavelength-converting material. The wavelength-converting material disclosed herein refers to a material capable of being excited by a first light to emit a second light having a wavelength different from a wavelength of the first light. For example, the wavelength converting materials described herein may have an absorption wavelength region in the visible light band and emission wavelength regions in the infrared light band.

In additional embodiments, the wavelength converting materials may comprise at least one, two, three, four, five, or six quantum dot compounds. In additional embodiments, examples of quantum dot compounds include: a) a first element selected from Group 2, 12, 13 or 14 and a second element selected from Group 16; b) a first element selected from Group 13 and a second element selected from Group 15; and c) an element selected from Group 14 of periodic table of elements; and composites comprising at least one of the substances having core-shell structures, etc. In yet additional embodiments, non-limiting examples of quantum dot compounds include MgO, MgS, MgSe, MgTe, CaO, CaS, CaSe, CaTe, SrO, SrS, SrSe, SrTe, BaO, BaS, BaSe, BaTe, ZnO, ZnS, ZnSe, ZnTe, CdO, CdS, CdSe, CdTe, HgO, HgS, HgSe, HgTe, Al2O3, Al2S3, Al2Se3, Al2Te3, Ga2O3, Ga2S3, Ga2Se3, Ga2Te3, In2O3, In2S3, In2Se3, In2Te3, SiO2, GeO2, SnO2, SnS, SnSe, SnTe, PbO, PbO2, PbS, PbSe, PbTe, AlN, AlP, AlAs, AlSb, GaN, GaP, GaAs, GaSb, InN, InP, InAs, InSb, BP, Si and Ge, and composites comprising at least one of the substances having core-shell structures. In further embodiments, quantum dot compounds have an average particle diameter from about 1, 2, 3, 4, 5, 6, 7, 8, 9, 10, 15, 20, 30, 40, 50 or 60 nm to about 50, 60, 70, 80, 90, 100, 200 or 300 nm. The quantum dot compounds may have an average particle diameter from about 1 nm to about 100 nm, from about 1 nm to about 500 nm, from about 10 nm to about 75 nm, or from about 20 nm to about 60 nm.

In further embodiments, the layer comprising the wavelength converting material may have a thickness from about 10, 20, 30, 40, 50, 60, 70, 80, 90 or 100 micrometer to about 100, 200, 300, 400, 500, 600 or 700 micrometer. In additional embodiments, the thickness of the layer comprising the wavelength converting material may be from about 20 micrometer to about 500 micrometer, from about 10 micrometer to about 1000 micrometer, from about 10 micrometer to about 500 micrometer, from about 100 micrometer to about 800 micrometer, or from about 300 micrometer to about 900 micrometer.

In one aspect, the layer comprising the infrared absorbing material disclosed herein and/or the infrared absorbing material itself absorbs a ray or radiation in an emission wavelength region of the wavelength converting material. In some embodiments, the infrared absorbing material absorbs ray or radiation from about 600, 650, 700, 750, 800, 850, 900, 950, 1000, 1050, 1100, 1150, 1200, 1250, 1300, 1400, or 1500 nm to about 1500, 1600, 1700, 1800, 1900, 2000 or 2100 nm. In additional embodiments, the infrared absorbing material absorbs ray or radiation from about 600 to about 2100 nm, from about 700 to about 2000 nm, from about 1000 to about 1500 nm, from about 800 nm to about 1200 nm, or from about 1000 nm to about 2000 nm. In some embodiments, an emission wavelength of the wavelength conversion material is within infrared region. In some embodiments, an emission wavelength of the wavelength conversion material is from about 600, 650, 700, 750, 800, 850, 900, 950, 1000, 1050, 1100, 1150, 1200, 1250, 1300, 1400, or 1500 nm to about 1500, 1600, 1700, 1800, 1900, 2000 or 2100 nm. In additional embodiments, an emission wavelength of the wavelength conversion material is from about 600 to about 2100 nm, from about 700 to about 2000 nm, from about 1000 to about 1500 nm, from about 800 nm to about 1200 nm, or from about 1000 nm to about 2000 nm.

In some embodiments, the composition of matter or a detecting layer or film disclosed herein may further comprise a bonding layer between the various layers, for example including between the layer comprising the infrared absorbing material and the wavelength converting material. The bonding layer may be formed from a conventionally known adhesive and is appropriately selected based on the materials to be bonded. For example, the adhesive may be an adhesive based on acrylic resin, epoxy resin, polyester resin, or the like. In additional embodiments, the bonding layer is transparent to visible light, in order to not have an effect on the retroreflectivity and the visibility of the background color (e.g., base color).

As used here, "transparent" refers to the average transmissivity of light with a specific target wavelength or wavelength band being approximately 60% or higher, preferably approximately 80% or higher, and more preferably approximately 90% or higher.

The thickness of the bonding layer is not particularly restricted and may be from about 10, 20, 30, 40, 50, 60, 70, 80, 90, 100, 200 micrometer to about 1000, 500, 300, 200, 100 micrometer. In further embodiments, the thickness of the bonding layer may be from about 10 micrometer to about 200 micrometer, from about 50 micrometer to about 200 micrometer, from about 10 micrometer to about 100 micrometer, or from about 20 micrometer to about 100 micrometer.

In one aspect, the first layer comprising the infrared absorbing material is disposed on at least a part of surface or at least one side of the second layer comprising the wavelength converting material. In some embodiments, the first layer includes machine-readable information. In further embodiments, the first layer may not contain human-readable information. As used herein, the term "machine-readable information" refers to information that is encoded in a form that can be optically imaged by a machine or computer and interpreted by its hardware and software, but not by a human. Theoretically, anything that can be read by a human can also be read by a machine, although it may not necessarily be comprehended by a human. As used herein, the term "human-readable information" refers to information that can be read and comprehended by a human. Exemplary types of machine-readable information include, for example, bar codes, color bar codes, 2D bar codes, geometric symbols as described in European Publication No. 0416742 and the like. The machine-readable information can be, for example, visible or invisible to a detector (e.g., human eye, camera).

In another aspect, the second layer comprising the wavelength converting material is disposed on at least a part of a surface of the first layer comprising the infrared absorbing material. In some embodiments, the second layer includes machine-readable information. In further embodiments, the second layer may not contain human-readable information. In additional embodiments, the second layer may transmit visible light and/or may be transparent.

In one aspect, the disclosure relates to a detecting layer comprising (i) a first layer comprising a retroreflective layer; and (ii) a second layer comprising a wavelength converting material. In one aspect, the disclosure also related to a detecting layer comprising a retroreflective material and a wavelength converting material.

A retroreflective layer includes materials which are generally used as a road sign, barricade, license plate, road surface marking or marking tape, as well as material in a retroreflective tape for vehicles and clothing. The retroreflective layer may include any suitable cube corner elements that are configured so as to reflect incoming light back in the direction of the light emitting source. The cube corner elements may have any favorable structure that can demonstrate a retroreflective function. For example, the cube corner elements may be perfect cubes (also referred to as full cubes or geometric cubes), truncated cubes, triangular pyramid with a cube corner shape, cavities with a cube corner shape, and the like. For example, the cube corner elements may include three surface structures with three side surfaces that essentially mutually intersect. During use, the retroreflective sheet may be provided facing the display surface towards the assumed viewer and the light source. The light that enters the display surface may enter the retroreflective layer and may be reflected by the each of the three side surfaces of the cube corner elements so as to be discharged from the display surface essentially in the direction facing the light source. In some embodiments, the cube corner elements may be inclined with regards to each other in order to enhance the retroreflectivity across a broader range of incoming light ray angles. Exemplary embodiments of the retroreflective layer based on the cube corners are disclosed in U.S. Pat. No. 5,138,488 (Szczech), U.S. Pat. No. 5,387,458 (Pavelka), U.S. Pat. No. 5,450,235 (Smith), U.S. Pat. No. 5,605,761 (Burns), U.S. Pat. No. 5,614,286 (Bacon), U.S. Pat. No. 5,691,846 (Benson, Jr), and U.S. Pat. No. 7,422,334 (Smith), all of which are incorporated by reference herein in their entirety.

In some embodiments, the retroreflective layer may comprise at least one, two or three resins selected from the group consisting of polycarbonate, polymethylmethacrylate, polyethylene terephthalate, aliphatic polyurethanes, ethylene copolymers, and ionomers thereof. The cube corner elements that are included in the retroreflective layer may be formed by direct molding on a resin film, as disclosed in U.S. Pat. No. 5,691,846 (Benson, Jr), for example. If the retroreflective layer is formed by radiation curing, examples of preferable resins may include a cured product of radiation curing compositions comprising at least one, two or three curing materials selected from the group consisting of polyfunctional acrylates, epoxy acrylates, acrylated urethane, and the like. These resins are advantageous for any one or a plurality of thermal stability, environmental stability, transparency, excellent peeling properties from tools and molds, as well as adhesion to other layers, and cured products of polycarbonates and epoxy acrylates may be advantageous from the perspective of transparency, thermal stability and the like.

The retroreflective layer according to some embodiments of the present disclosure may have various thicknesses, but generally is from about 40, 50, 55, 60, or 70 micrometer to about 150, 100, 60, 55 or 55 micrometer. The thickness of the retroreflective sheet refers to the distance between the main surface of the retroreflective layer and the highest apex of the structured surface. The cube corner elements layer may have various heights, but generally are about 50, 60, 70, 80, 90 or 100 micrometer to about 100, 110, 120 or 130 micrometer. The height of the cube corner elements refers to the length in the vertical direction with regards to the surface of the retroreflective sheet in the region effective for retroreflection of the side surfaces that form the cube corner elements. Retroreflection may also be achieved through glass beads imbedded in the film disclosed herein. In some embodiments, the glass beads comprise aluminum-coated barium titanate. In additional embodiments, an average particle size of the glass beads is from 10, 20, 30, 40, 50 or 100 micrometer to about 1000, 800, 600, 400, 300 or 200 micrometer.

As used herein, "retroreflective" and "retroreflection" refers to a material property or phenomenon where light from a light source that enters a certain material is reflected back towards the light source.

In one aspect, the present disclosure relates to a film comprising the detecting layer disclosed herein and a substrate. In some embodiments, the substrate is on another surface of the second layer comprising the wavelength converting material, which is different from the surface on which the first layer comprising the infrared absorbing material is disposed. In additional embodiments, the substrate is on another surface of the first layer comprising the infrared absorbing material, which is different from the surface on which the second layer comprising the wavelength converting material is disposed. In further embodiments, the substrate may reflect infrared ray or radiation disclosed herein or a ray or radiation of at least 700 nm. In yet further embodiments, the substrate reflecting light of at least 700 nm may comprise a metal layer at least one, two or three elements selected from the group consisting of aluminum, copper, silver, titanium, zirconium and niobium. In yet additional embodiments, the substrate reflecting light of at least 700 nm may comprise at least one element selected from the group consisting of glass, rubber, ceramic and black paint.

In one aspect, the present disclosure relates to a device comprising the detecting layer or the film disclosed herein, wherein the first layer comprising the infrared absorbing material or the second layer comprising the wavelength converting material is on a visible layer of the device. The visible layer refers to a layer exposed to a view by human or a machine, for example, including an infrared detector. In some embodiments, the device is not a solar panel.

In one aspect, the present disclosure relates to a kit to prepare the detecting layer or the film, comprising a first solution comprising the infrared absorbing material, and a second solution comprising the wavelength converting material. Each of the first and second solutions may independently comprise water or organic solvent, such as acetone, methyl ethyl ketone, diethyl ketone, toluene, chloroform, N-methyl-2-pyrrolidone, .gamma.-butylolactone, N,N-dimethylacetoamide, dimethylsulfoxide, methanol, ethanol, 1-propanol, 2-propanol, 1-butanol, 2-butanol, t-butanol, 2-methoxyethanol, diethylene glycol diethylether, diethylene glycol dibutyl ether, propylene glycol monomethyl ether, dipropylene glycol monomethyl ether, propylene glycol rnonomethy ether acetate, methyl lactate, ethyl lactate, butyl lactate, ethyl acetate, butyl acetate, methyl-1,3-butylene glycol acetate, 1,3-butylene glycol acetate, cyclohexanone, cyclopentanone, tetrahydrofuranm, or a mixture thereof. In one aspect, the present disclosure relates to a tape comparing the detecting layer or the film disclosed herein.

In one aspect, the present disclosure relates to a tape comprising a substrate and a layer comprising a wavelength converting material disclosed herein on at least a part of a surface of the substrate.

In one aspect, the present disclosure relates to a detecting system comprising (i) the detecting layer, the film, the device, the kit and/or the tape disclosed herein, and (ii) a detector to detect infrared emission.

In one aspect, the present disclosure relates to a method of detecting machine-readable information, the method comprising: (i) applying near-infrared light to an applied surface of the detecting layer, the film, the device or the tape; and (ii) detecting infrared emission from the applied surface.

In one aspect, the present disclosure relates to a method of preparing the detecting layer or the film disclosed herein, the method comprising: disposing a first solution comprising the infrared absorbing material, and disposing a second solution comprising the wavelength converting material. In some embodiments, the first and second solutions are disposed on a substrate or a mold. The disposing may comprise (i) thermal transfer printing or (ii) mixing in a binder polymer and/or photosensitive resin composition and curing the binder polymer and/or photosensitive resin composition.

Thermal transfer printing may be a digital printing method in which material is applied to some other material by melting a coating of ribbon so that it stays glued to the material on which the print is applied.

In some embodiments, the first layer and the second layer may be formed using a photosensitive resin comprising a binder polymer and/or a photopolymerizable compound. In further embodiments, the photosensitive resin composition includes (A) a binder polymer, (B) a photopolymerizable compound having an ethylenically unsaturated bond group, and (C) photoinitiator. The photosensitive resin composition may further include other components, if necessary. The term "(meth)acrylate" used throughout the present specification refers to the "acrylate" and its corresponding "methacrylate." Similarly, the term "(meth)acrylic" refers to "acrylic" and its corresponding "methacrylic" compound.

[Component (A): Binder Polymer]

In the photosensitive resin composition of the first embodiment, examples of the component (A) include (meth) acrylic resins, styrene resins, epoxy resins, amide resins, amide epoxy resins, alkyd resins, phenol resins, ester resins, urethane resins, epoxy (meth)acrylate resins obtained by a reaction of epoxy resins with (meth)acrylic acid, and acid-modified epoxy (meth)acrylate resins obtained by a reaction of epoxy (meth)acrylate resins with acid anhydrides. As the component (A), (meth)acrylic resins are preferred from the viewpoint of high alkali developability and film formability. Examples of the (meth)acrylic resins include copolymers having at least one selected from structural units derived from (a1) (meth)acrylic acid (hereinafter, referred to as "component (a1)" in some cases) and structural units derived from (a2) alkyl (meth)acrylate esters (hereinafter, referred to as "component (a2)" in some cases); copolymers having a structural unit derived from (a1) (meth)acrylic acid and a structural unit derived from (a2) alkyl (meth)acrylate esters are preferred.

Examples of the component (a2) include methyl (meth) acrylate, ethyl (meth)acrylate, propyl (meth)acrylate, butyl (meth)acrylate, 2-ethylhexyl (meth)acrylate, and hydroxyl- ethyl (meth)acrylate.

[Component (B): Photopolymerizable Compound]

As the photopolymerizable compounds which is the component (B), a photopolymerizable compound having an ethylenically unsaturated group can be used, for example.

Examples of the photopolymerizable compound having an ethylenically unsaturated group include monofunctional vinyl monomers, bifunctional vinyl monomers, and polyfunctional vinyl monomers having at least three ethylenically unsaturated groups.

Examples of the monofunctional vinyl monomers include (meth)acrylic acid and alkyl (meth)acrylate esters exemplified as the monomers used in synthesis of the copolymer used as the component (A), and monomers copolymerizable therewith.

Examples of the bifunctional vinyl monomers include polyethylene glycol di(meth)acrylate, trimethylolpropane di(meth)acrylate, polypropylene glycol di(meth)acrylate, 2,2-bis(4-(meth)acryloxypolyethoxypolypropoxyphenyl) propane, bisphenol A diglycidyl ether di(meth)acrylate, and esterified products of compounds having a hydroxyl group and an ethylenically unsaturated group (such as β-hydroxyethyl acrylate and (β-hydroxyethyl methacrylate) and polyvalent carboxylic acids (such as phthalic anhydride).

Examples of the polyfunctional vinyl monomers having at least three ethylenically unsaturated groups include compounds obtained by a reaction of polyhydric alcohols with α,β-unsaturated carboxylic acids (such as acrylic acid and methacrylic acid), such as trimethylolpropane tri(meth)acrylate, tetramethylolmethane tri(meth)acrylate, tetramethylolmethane tetra(meth)acrylate, dipentaerythritol penta(meth) acrylate, dipentaerythritol hexa(meth)acrylate and ditrimethylolpropane tetra(meth)acrylate; compounds obtained by an addition reaction of glycidyl group-containing compounds with α, β-unsaturated carboxylic acids, such as trimethylolpropane triglycidyl ether tri(meth)acrylate; and compounds obtained by an addition reaction of diglycerols with α, β-unsaturated carboxylic acids, such as diglycerol (meth)acrylate.

Among these, the polyfunctional vinyl monomers having at least three ethylenically unsaturated groups are preferred; from the viewpoint of high readiness in development, (meth) acrylate compounds having a skeleton derived from pentaerythritol, (meth)acrylate compounds having a skeleton derived from dipentaerythritol or (meth)acrylate compounds having a skeleton derived from trimethylolpropane are more preferred, (meth)acrylate compounds having a skeleton derived from dipentaerythritol or (meth)acrylate compounds having a skeleton derived from trimethylolpropane are still more preferred, (meth)acrylate compounds having a skeleton derived from trimethylolpropane are particularly preferred.

Here, the term "(meth)acrylate compound having a skeleton derived from" will be described using an example of a (meth)acrylate compound having a skeleton derived from trimethylolpropane.

The (meth)acrylate compound having a skeleton derived from trimethylolpropane indicates an esterified product of trimethylolpropane and (meth)acrylic acid, and the esterified product can include compounds modified with an alkyleneoxy group. As the esterified product, compounds having the maximum number of ester bonds of 3 in one molecule are preferred; compounds having 1 to 2 ester bonds may be mixed. Moreover, as the (meth)acrylate compound having a skeleton derived from trimethylolpropane, a compound obtained by dimerizing a trimethylolpropane di(meth)acrylate compound may be used.

[Component (C): Photopolymerization Initiator]

The (C) photopolymerization initiator in the photosensitive resin composition of the present embodiment can further contain (c2) a photopolymerization initiator other than the component (c1) (hereinafter, referred to as "component (c2)" in some cases). Examples of the component (c2) include aromatic ketones such as benzophenone, 4-(dimethylamino)-4'-methoxybenzophenone, 2-benzyl-2-dimethylamino-1-(4-morpholinophenyl)-1-butanone, 2-methyl-1-[4-(methylthio)phenyl]-2-morpholino-1-propanone; oxime ester compounds such as 1-[4-(phenylthio)phenyl]-1,2-octanedione 2-(O-benzoyloxime), 1-[9-ethyl-6-(2-methylbenzoyl)-9H-carbazol-3-yl]ethanone O-acetyloxime; phosphine oxide compounds such as diphenyl-2,4,6-trimethylbenzoylphosphine oxide; and benzyl derivatives such as benzyl dimethyl ketal.

The invention claimed is:

1. A detecting multi-layer comprising:
a first layer comprising an infrared absorbing material; and
a second layer comprising a wavelength converting material,
wherein a surface of the first layer facing the second layer has a different size compared to a surface of the second layer facing the first layer,
the first layer and the second layer are disposed parallel to each other,
the first layer is disposed on only a part of the surface of the second layer facing the first layer, and
the first layer includes machine-readable information.

2. The detecting multi-layer according to claim 1, wherein the infrared absorbing material is selected from the group consisting of cyanine compounds, phthalocyanine compounds, dithiol metal complexes, naphthoquinone compounds, diimonium compounds, azole compounds, cesium tungstenate compounds (CWO), antimony doped tin oxides (ATO), tin doped indium oxide (ITO), titanium oxide, zirconium oxide, tantalum oxide, niobium oxide, zinc oxide, indium oxide, tin oxide, cesium oxide, and zinc sulfate.

3. The detecting multi-layer according to claim 1, wherein the wavelength converting material comprises a quantum dot compound.

4. The detecting multi-layer according to claim 1, wherein the first layer and/or the infrared absorbing material absorbs a ray or radiation in the emission wavelength region of the wavelength converting material.

5. The detecting multi-layer according to claim 1, wherein the infrared absorbing material absorbs a ray or radiation in from about 700 nm to about 2000 nm.

6. The detecting multi-layer according to claim 1, wherein an emission wavelength of the wavelength conversion material is within infrared region.

7. The detecting multi-layer according to claim 1, wherein an emission wavelength of the wavelength conversion material is from about 700 nm to about 2000 nm.

8. A film comprising the detecting multi-layer of claim 1, further comprising a substrate on another surface of the second layer.

9. A film comprising the detecting multi-layer of claim 1, further comprising a substrate on another surface of the first layer.

10. A device comprising the detecting multi-layer of claim 1, wherein the first or second layer is on a visible layer of the device.

11. The device according to claim 10, wherein the device is not a solar panel.

12. The detecting multi-layer according to claim 1, wherein the detecting multi-layer has only one layer comprising an infrared absorbing material.

13. The detecting multi-layer according to claim 1, wherein the detecting multi-layer has only one layer comprising the wavelength converting material.

14. A detecting multi-layer comprising:
a first layer comprising an infrared absorbing material; and
a second layer comprising a wavelength converting material,
wherein a surface of the first layer facing the second layer has a different size compared to a surface of the second layer facing the first layer,
the first layer and the second layer are disposed parallel to each other,
the second layer is disposed on only a part of the surface of the first layer facing the second layer, and
the second layer includes machine-readable information.

15. The detecting multi-layer according to claim 14, wherein the second layer transmits visible light.

16. The detecting multi-layer according to claim 14, wherein the second layer is transparent.

* * * * *